US012119580B2

(12) United States Patent
Huang et al.

(10) Patent No.: US 12,119,580 B2
(45) Date of Patent: Oct. 15, 2024

(54) EXTERNAL DEVICE-TO-EXTERNAL DEVICE CONNECTOR FOR WIRELESS COMMUNICATION DEVICES

(71) Applicant: Outdoor Wireless Networks LLC, Claremont, NC (US)

(72) Inventors: Mulan Huang, Suzhou (CN); Yujun Zhang, Suzhou (CN); Yuanyao Zhou, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 276 days.

(21) Appl. No.: 17/720,895

(22) Filed: Apr. 14, 2022

(65) Prior Publication Data

US 2022/0376418 A1 Nov. 24, 2022

(30) Foreign Application Priority Data

May 18, 2021 (CN) ......................... 202121058183.4

(51) Int. Cl.
*H01R 13/05* (2006.01)
*H01R 12/71* (2011.01)
(Continued)

(52) U.S. Cl.
CPC ............. *H01R 13/04* (2013.01); *H01R 12/71* (2013.01); *H01R 13/40* (2013.01); *H01R 13/502* (2013.01); *H01R 31/06* (2013.01)

(58) Field of Classification Search
CPC ........ H01R 13/04; H01R 12/71; H01R 13/40; H01R 13/502; H01R 31/06; H01R 12/73; H01R 24/542; H01R 12/09
(Continued)

(56) References Cited

U.S. PATENT DOCUMENTS 4,591,226 A * 5/1986 Hargett ................. E21B 17/028 439/192
5,581,134 A * 12/1996 Romerein .............. H01R 24/44 200/50.01
(Continued)

FOREIGN PATENT DOCUMENTS

CN 205752638 U 11/2016
CN 208738464 U 4/2019
CN 212182705 U 12/2020

OTHER PUBLICATIONS

"International Search Report and Written Opinion corresponding to International Application No. PCT/US2022/025191 mailed Aug. 5, 2022".
(Continued)

*Primary Examiner* — Alexander Gilman
(74) *Attorney, Agent, or Firm* — Myers Bigel, P.A.

(57) ABSTRACT

The present disclosure relates to an external device-to-external device connector for wireless communication devices, which is configured to electrically connect two spaced external devices together, and comprises two interface members and a coupling member. The inner conductor part and the insulation part of the coupling member are held together by the concave-convex fitting parts opposite to each other, and there is a first gap between the concave-convex fitting part of the inner conductor part and that of the insulation part, which allows the inner conductor part to have radial displacement relative to the insulation part; or, the outer conductor part and the insulating part of the coupling member are held together by the concave-convex fitting parts opposite to each other, and there is a second gap between the concave-convex fitting part of the outer conductor part and that of the insulating part, which allows radial displacement of the insulating part relative to the outer
(Continued)

conductor part. The external device-to-external device connector can achieve satisfactory RL and PIM performance.

19 Claims, 8 Drawing Sheets

(51) Int. Cl.
*H01R 13/04* (2006.01)
*H01R 13/40* (2006.01)
*H01R 13/502* (2006.01)
*H01R 31/06* (2006.01)

(58) Field of Classification Search
USPC .......................................................... 439/884
See application file for complete search history.

(56) References Cited

U.S. PATENT DOCUMENTS 5,598,132 A * 1/1997 Stabile .................... H01R 24/46 333/260
8,197,287 B2 * 6/2012 Rosenberger ........ H01R 24/542 439/675
8,298,020 B1 * 10/2012 Chen ....................... H01R 24/40 439/852
8,419,469 B2 * 4/2013 Montena ................ H01R 24/58 439/585
9,112,323 B2 * 8/2015 Goebel .................... H01R 4/48
9,147,955 B2 * 9/2015 Hanson .............. H01R 13/6591
9,423,481 B2 * 8/2016 Hechtfischer ........ H01R 13/646
9,455,508 B2 * 9/2016 Watkins ............... H01R 9/0518
9,484,646 B2 * 11/2016 Thomas ............... H01R 9/0521
9,490,592 B2 * 11/2016 Chastain .............. H01R 24/545
9,935,450 B2 * 4/2018 Montena .................. H01R 9/05
10,658,794 B2 * 5/2020 Zhang ..................... H01R 24/40
10,784,615 B2 * 9/2020 Bredbeck ............... H01R 13/73
10,826,230 B1 * 11/2020 Goebel .................. H01R 43/26
10,873,155 B2 * 12/2020 Haemmerling ...... H01R 13/639
11,078,762 B2 * 8/2021 Mauldin ............. E21B 43/1185
11,158,984 B2 * 10/2021 Graßl .................... H01R 13/111
11,233,362 B2 * 1/2022 Hanson ................ H01R 9/0527
2002/0013088 A1 * 1/2002 Rodrigues ............ H01R 13/506 439/578
2004/0114995 A1 * 6/2004 Jones ...................... H01P 1/045 403/294
2012/0309230 A1 * 12/2012 Watanabe .............. H01R 31/06 439/620.21
2013/0115809 A1 * 5/2013 Hanson .............. H01R 13/6591 439/578
2013/0244509 A1 * 9/2013 Holland ................. H01R 24/46 439/840
2015/0038009 A1 * 2/2015 Gibson .................. H01R 13/08 439/578
2015/0207243 A1 * 7/2015 Thomas ............... H01R 9/0521 29/857
2015/0288084 A1 * 10/2015 Shaw ................... H01R 24/542 439/578
2018/0006398 A1 1/2018 Cuban et al.
2018/0006420 A1 * 1/2018 Urtz, Jr. ............... H01R 24/525
2018/0124921 A1 5/2018 Song et al.
2019/0089086 A1 * 3/2019 Muramatsu ........ H01R 13/5213
2019/0165512 A1 * 5/2019 Krize ..................... H01R 13/04
2019/0190185 A1 * 6/2019 Mori ..................... H01R 13/512
2019/0190211 A1 * 6/2019 Yamanashi ........ H01R 13/6592
2022/0376418 A1 * 11/2022 Huang ................. H01R 13/502

OTHER PUBLICATIONS

International Preliminary Report on Patentability corresponding to PCT/US2022/025191; Issued Nov. 21, 2023 (7 pages).

* cited by examiner

EXTERNAL DEVICE-TO-EXTERNAL DEVICE CONNECTOR FOR WIRELESS COMMUNICATION DEVICES

RELATED APPLICATION

The present application claims priority from and the benefit of Chinese Utility Model Application No. 202121058183.4, filed May 18, 2021, the disclosure of which is hereby incorporated herein by reference in full.

FIELD OF THE INVENTION

The present disclosure relates to the field of wireless communications in general. More specifically, the present disclosure relates to an external device-to-external device connector for wireless communication devices.

BACKGROUND OF THE INVENTION

In a wireless communication system, a small external device-to-external device connector is used to connect two separate devices together. The device may be, for example, a base station antenna, a filter, a radio remote unit (RRU), and the like.

Due to device installation position errors (e.g., position deviation between a base station antenna and a remote radio unit (RRU) or position deviation between a filter and a base station antenna), manufacturing errors of device components (e.g., flatness of circuit board), etc., two devices to be connected may be unable to be axially aligned and/or radially aligned. This requires that the connector system can adapt to the axial floating and/or radial floating between the devices. Generally speaking, floating in connector system is very important for reliable connection and ensuring the integrity of RF signals in the whole connection matrix. However, the radial and axial floating in the connector system (except the interface structure) may affect the electrical performance, resulting in poor return loss and low passive intermodulation (PIM) performance.

SUMMARY OF THE INVENTION

The present disclosure provides an external device-to-external device connector for wireless communication devices that can overcome at least one of the above defects of existing products.

The first aspect of the present disclosure relates to an external device-to-external device connector for a wireless communication base station, wherein the external device-to-external device connector is configured to electrically connect two spaced external devices together, and comprises:

two interface members, each of which comprises an inner contact part, an insulating layer and an outer housing sequentially from inside to outside in the radial direction, wherein the outer housing of the interface member comprises a coupling member connecting portion and an external device connecting portion that are connected with each other, and the external device connecting portion is configured to be connected to an external device; and a coupling member, configured to connect the two interface members together and comprising an inner conductor part, at least one insulation part and at least one outer conductor part sequentially from inside to outside in the radial direction, wherein the inner conductor part receives and holds the ends of the inner contact parts of the two interface members at both ends, the insulation part is configured to space the inner conductor part and the outer conductor part, and the end part of the outer conductor part is received and held in the coupling member connecting portion of the outer housing of the interface member;

wherein the inner conductor part and the insulation part of the coupling member are held together by the concave-convex fitting parts opposite to each other, and there is a first gap between the concave-convex fitting part of the inner conductor part and that of the insulation part, which allows the inner conductor part to have radial displacement relative to the insulation part; or, the outer conductor part and the insulating part of the coupling member are held together by the concave-convex fitting parts opposite to each other, and there is a second gap between the concave-convex fitting part of the outer conductor part and that of the insulating part, which allows radial displacement of the insulating part relative to the outer conductor part.

In some embodiments, the inner diameter of the coupling member is roughly equal to or slightly smaller than the outer diameter of the outer conductor part of the coupling member, and the outer conductor part of the coupling member is held in the coupling member by radially outward elastic force.

In some embodiments, the coupling member is flared to form a hornlike shape at the free end of its hollow interior, so as to guide the outer conductor part of the coupling member into the interior of the coupling member.

In some embodiments, the coupling member is provided with a stepped part in its hollow interior to abut against the outer conductor part of the coupling member.

In some embodiments, the external device connecting portion fixes the insulating layer of the interface member in its hollow interior.

In some embodiments, the external device is a base station antenna, a filter, and/or a radio remote unit.

In some embodiments, the external device connecting portion connects the interface member to the external device by welding, screwing or compression.

In some embodiments, the external device connecting portion comprises one or a plurality of elongated legs extending axially outward from its free end, and the one or the plurality of legs are configured to pass through the through holes on the external device and be welded to the external device.

In some embodiments, the external device connecting portion is provided with an external thread on its outer surface configured to be connected to the internal thread of the external device.

In some embodiments, the external device connecting portion enters the cavity of the external device by interference compression.

In some embodiments, the inner contact part is roughly arranged on the central axis of the outer housing of the interface member.

In some embodiments, the insulating layer is fixed in the hollow interior of the external device connecting portion and surrounds and fixes the inner contact part.

In some embodiments, both opposite ends of the inner conductor part have grooves to respectively receive the inner contact parts of the two interface members, wherein the inner contact parts can slide axially in the grooves.

In some embodiments, the outer surface of the inner conductor part is provided with at least one concave for receiving the at least one insulating part, and the first gap is located between the concave surface and the inner surface of the insulating part.

In some embodiments, the axial length of the concave is roughly equal to that of the insulating part, and the diameter of the concave is smaller than the inner diameter of the insulating part.

In some embodiments, the outer conductor part comprises a main body part and two interface member connecting portions located at two sides of the main body part, wherein the interface member connecting portions are configured to be connected into the coupling member connecting portion of the outer housing of the interface member.

In some embodiments, the coupling member comprises two insulating parts and two outer conductor parts, and further comprises an outer housing, and each outer conductor part comprises a main body part and an interface member connecting portion located outside the main body part, wherein the main body parts of the two outer conductor parts are respectively received and fixed in both ends of the outer housing of the coupling member, two insulation parts are respectively held inside, and the two interface member connecting portions are respectively connected into the coupling member connecting portions of the outer housings of the two interface members.

In some embodiments, the main body part is provided on its inner surface with a concave for receiving the insulating part, and the second gap is located between the surface of the concave and the outer surface of the insulating part.

In some embodiments, the axial length of the concave is roughly equal to that of the insulating part, and the diameter of the concave is larger than the outer diameter of the insulating part.

In some embodiments, the inner conductor part and the insulating part are integrally formed or separately formed but fixed together.

In some embodiments, the interface member connecting portion comprises a plurality of elastic claw-like parts extending axially outward from the main body part, and the elastic claw-like parts are distributed on the axial outer surface of the main body part at uniform or uneven intervals in the circumferential direction.

In some embodiments, each of the plurality of elastic claw-like parts is provided with a protrusion protruding radially outward, and the outer diameter of the outer contour formed by all the protrusions is slightly larger than the inner diameter of the coupling member connecting portion of the interface member.

In some embodiments, the protrusion is configured to be pressed by the inner surface of the coupling member connecting portion when the interface connecting portion is inserted into the coupling member connecting portion to elastically deform the elastic claw-like part radially inward, so as to be held on the inner surface of the coupling member connecting portion by radially outward elastic force.

In some embodiments, the protrusion can slide axially on the inner surface of the coupling member.

In some embodiments, the radial dimension of the first gap and the second gap is between 0.05 and 0.5 mm.

The second aspect of the present disclosure relates to an external device-to-external device connector for a wireless communication base station, wherein the external device-to-external device connector is configured to electrically connect two spaced external devices together, and comprises:

two interface members, each of which comprises an inner contact part, an insulating layer and an outer housing sequentially from inside to outside in the radial direction, wherein the outer housing of the interface member comprises a coupling member connecting portion and an external device connecting portion that are connected with each other, and the external device connecting portion is configured to be connected to an external device; and a coupling member, configured to connect the two interface members together and comprising an inner conductor part, an insulation part, two outer conductor parts, and an outer housing sequentially from inside to outside in a radial direction, wherein the inner conductor part receives and holds the ends of inner contact parts of the two interface members at both ends, and the insulation part is configured to space the inner conductor part from the outer conductor part, the ends of the two outer conductor parts are received and held in the coupling member connecting portion of the outer housing of the interface member, and the outer housing is configured to hold the two outer conductor parts and the insulating part;

wherein the inner conductor part and the insulation part of the coupling member are held together by the concave-convex fitting parts opposite to each other, and there is a first gap between the concave-convex fitting part of the inner conductor part and that of the insulation part, which allows the inner conductor part to have radial displacement relative to the insulation part; or, the outer housing and the insulating pail of the coupling member are held together by the concave-convex fitting parts opposite to each other, and there is a second gap between the concave-convex fitting pail of the outer housing and that of the insulating part of the coupling member, which allows radial displacement of the insulating part relative to the outer housing of the coupling member.

In some embodiments, the inner diameter of the coupling member is roughly equal to or slightly smaller than the outer diameter of the outer conductor part of the coupling member, and the outer conductor part is held in the coupling member connecting portion by radially outward elastic force.

In some embodiments, the coupling member connecting portion is flared to form a hornlike shape at the free end of the hollow interior thereof so as to guide the outer conductor part of the coupling member into the interior of the connecting portion of the coupling member.

In some embodiments, the coupling member is provided with a stepped part inside the hollow interior to abut against the outer conductor part of the coupling member.

In some embodiments, the external device connecting portion fixes the insulating layer of the interface member inside the hollow interior thereof.

In some embodiments, the external device is a base station antenna, a filter, and/or a remote radio unit.

In some embodiments, the external device connecting portion connects the interface member to the external device by welding, threaded connection, or compression.

In some embodiments, the external device connecting portion includes one or a plurality of elongated legs protruding axially outward from its free end, and the one or the plurality of legs are configured to pass through holes on the external device and be welded to the external device.

In some embodiments, the external device connecting portion is provided with an external thread on its outer surface, and the external thread is configured to be connected to an internal thread of the external device.

In some embodiments, the external device connecting portion enters the cavity of the external device by interference compression.

In some embodiments, the inner contact part is roughly arranged on the central axis of the outer housing of the interface member.

In some embodiments, the insulating layer is fixed in the hollow interior of the external device connecting portion and surrounds and fixes the inner contact part.

In some embodiments, both opposite ends of the inner conductor part have grooves to respectively receive the inner contact parts of the two interface parts, wherein the inner contact parts can slide axially in the grooves.

In some embodiments, the outer surface of the inner conductor part is provided with a concave for receiving the insulating part, and the first gap is located between the surface of the concave and the inner surface of the insulating part.

In some embodiments, the axial length of the concave is roughly equal to that of the insulating part, and the diameter of the concave is smaller than the inner diameter of the insulating part.

In some embodiments, the outer housing of the coupling is provided with a stepped part in its interior, and the inner surface of the stepped part is provided with a concave for receiving the insulating part, and the second gap is located between the surface of the concave and the outer surface of the insulating part.

In some embodiments, the axial length of the concave is roughly equal to that of the insulating part, and the diameter of the concave is larger than the outer diameter of the insulating pail.

In some embodiments, the inner conductor part and the insulating part are integrally formed or separately formed but fixed together.

In some embodiments, each outer conductor part comprises a main body part and an interface member connecting portion located outside the main body part, the main body parts of the two outer conductor parts are respectively received and fixed in both ends of the outer housing of the coupling member, and the connecting portions of the two interface members are respectively connected into the coupling member connecting portions of the outer housing of the two interface members.

In some embodiments, the interface member connecting portion comprises a plurality of elastic claw-like parts extending axially outward from the main body part, and the elastic claw-like parts are distributed on the axial outer surface of the main body part at uniform intervals or uneven intervals in the circumferential direction.

In some embodiments, each of the plurality of elastic claw-like pails is provided with a protrusion protruding radially outward, and the outer diameter of the outer contour formed by all the protrusions is slightly larger than the inner diameter of the coupling member connecting portion of the interface member.

In some embodiments, the protrusion is configured to be pressed by the inner surface of the coupling member connecting portion when the interface member connecting portion is inserted into the coupling member connecting portion to elastically deform the elastic claw-like part radially inward, so as to be held on the inner surface of the coupling member connecting portion with radially outward elastic force.

In some embodiments, the protrusion can slide axially on the inner surface of the coupling member.

In some embodiments, the radial dimension of the first gap and the second gap is between 0.05 and 0.5 mm.

Other features and advantages of the subject technology of the present disclosure will be explained in the description below, and in part will be apparent from the description, or may be learned by practice of the subject technology of the present disclosure. The advantages of the subject technology of the present disclosure will be realized and attained by the structure particularly pointed out in the written Specification and Claims hereof as well as the attached drawings.

It should be understood that both the foregoing general description and the following detailed description are exemplary and explanatory and are intended to provide further explanation of the subject technology of the present disclosure as claimed.

BRIEF DESCRIPTION OF THE DRAWINGS

A plurality of aspects of the present disclosure will be better understood after reading the following specific embodiments with reference to the attached drawings. Among the attached drawings

DETAILED DESCRIPTION OF SPECIFIC EMBODIMENTS

Figure 1:
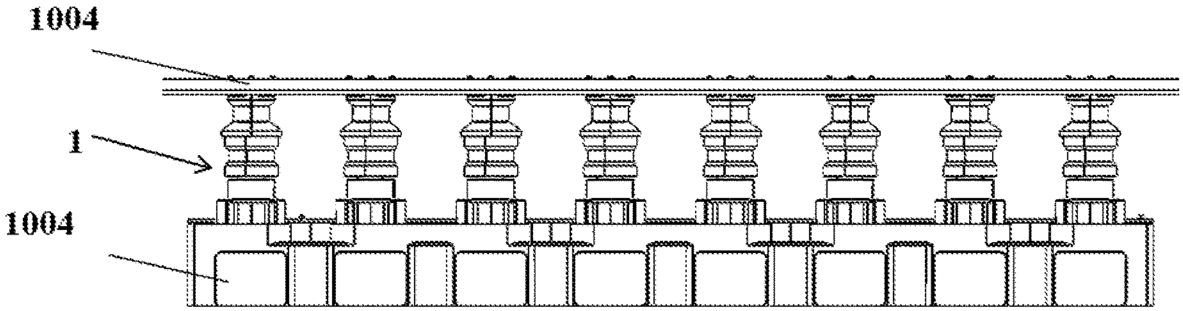
FIG. 1 is a schematic view showing the usage environment of an external device-to-external device connector according to the present disclosure.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that in all the attached drawings, the same symbols denote the same elements. In the attached drawings, the dimensions of certain features can be changed for clarity.

It should be understood that the words in the Specification are only used to describe specific embodiments and are not intended to limit the present disclosure. Unless otherwise defined, all terms (including technical terms and scientific terms) used in the Specification have the meanings commonly understood by those of ordinary skill in the art. For brevity and/or clarity, well-known functions or structures may not be further described in detail.

The singular forms “a”, “an”, “the” and “this” used in the Specification all include plural forms unless clearly indicated. The words “comprise”, “contain” and “have” used in the Specification indicate the presence of the claimed features, but do not exclude the presence of one or more other features. The word “and/or” used in the Specification includes any or all combinations of one or a plurality of the related listed items. The words “between X and Y” and “between approximate X and Y” used in the Specification shall be interpreted as including X and Y. As used herein, the wording “between approximate X and Y” means “between approximate X and approximate Y”, and as used herein, the wording “from approximate X to Y” means “from approximate X to approximate Y”.

In the Specification, when it is described that an element is “on” another element, “attached” to another element, “connected” to another element, “coupled” to another element, or “in contact with” another element, etc., the element may be directly on another element, attached to another element, connected to another element, coupled to another element, or in contact with another element, or an intermediate element may be present. In contrast, if an element is described “directly” “on” another element, “directly attached” to another element, “directly connected” to another element, “directly coupled” to another element or “directly in contact with” another element, there will be no intermediate elements. In the Specification, a feature that is arranged “adjacent” to another feature, may denote that a feature has a part that overlaps an adjacent feature or a part located above or below the adjacent feature.

In the Specification, words expressing spatial relations such as “upper”, “lower”, “left”, “right”, “front”, “rear”, “top”, and “bottom” may describe the relation between one feature and another feature in the attached drawings. It should be understood that, in addition to the locations shown in the attached drawings, the words expressing spatial relations further include different locations of a device in use or operation. For example, when a device in the attached drawings rotates reversely, the features originally described as being “below” other features now can be described as being “above” the other features“. The device may also be oriented by other means (rotated by 90 degrees or at other locations), and at this time, a relative spatial relation will be explained accordingly.

FIG. 1 shows a schematic view of the use of an external device-to-external device connector 1 according to the present disclosure. As shown in the figure, the external device-to-external device connector 1 is connected to two external devices 4 at both ends thereof respectively for electrically connecting the two external devices 4 together. The external device 4 may be various devices or circuit boards for example, a circuit board mounted on a reflector or a calibration board of an antenna, or a circuit board inside an RRU).

Figure 2A:
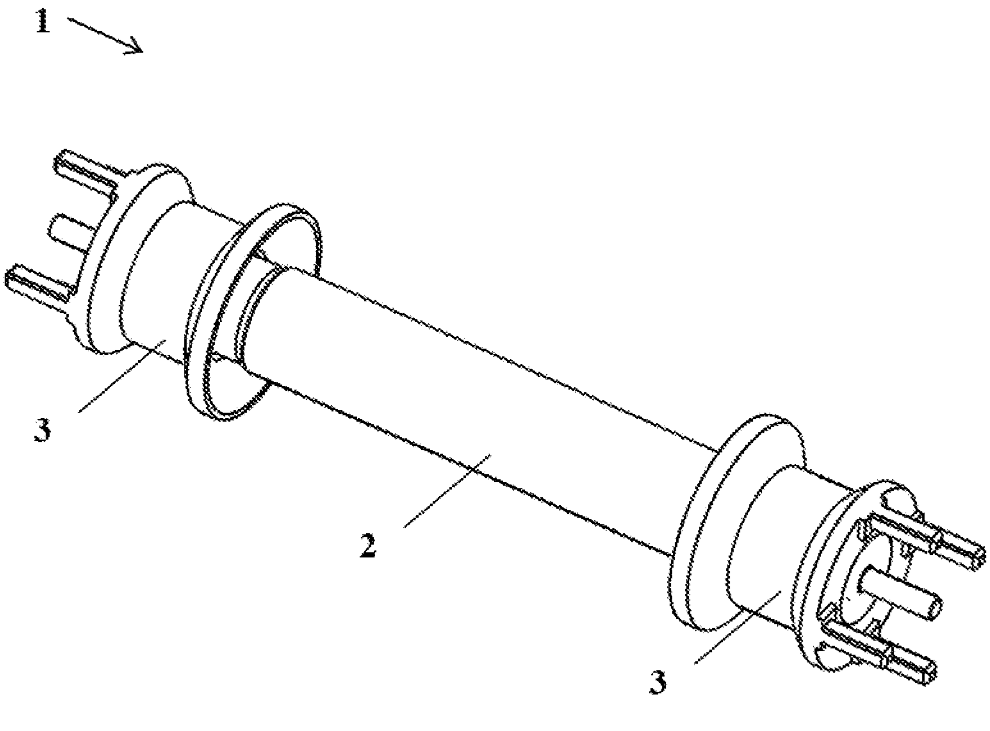
FIGS. 2A and 2B respectively show a perspective view and a sectional view of an external device-to-external device connector according to a first embodiment of the present disclosure.
Figure 2B:
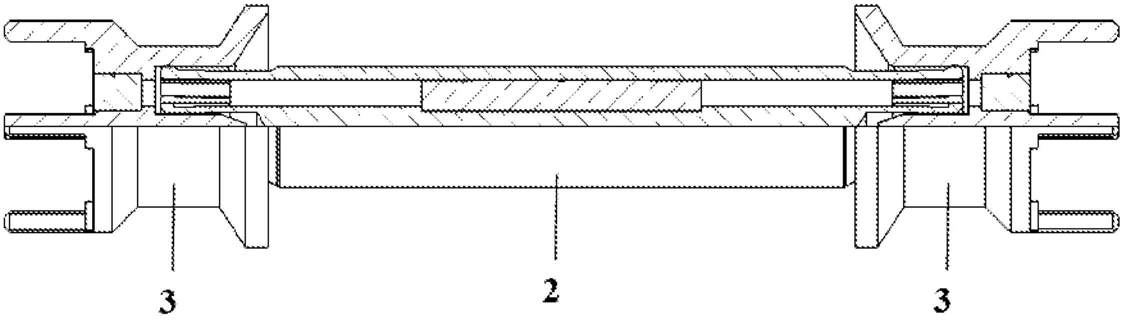

FIGS. 2A and 2B show a perspective view and a sectional view of the external device-to-external device connector 1. As shown in the figure, the external device-to-external device connector 1 includes a coupling member 2 and two interface members 3 connected to both ends of the coupling member 2. The coupling member 2 is used to mechanically and electrically connect two interface members 3 together, and allows one or both of the two interface members 3 to be axially offset and/or radially offset relative to the coupling member 2. Two interface members 3 are connected to two external devices 4, respectively.

Figure 3A:
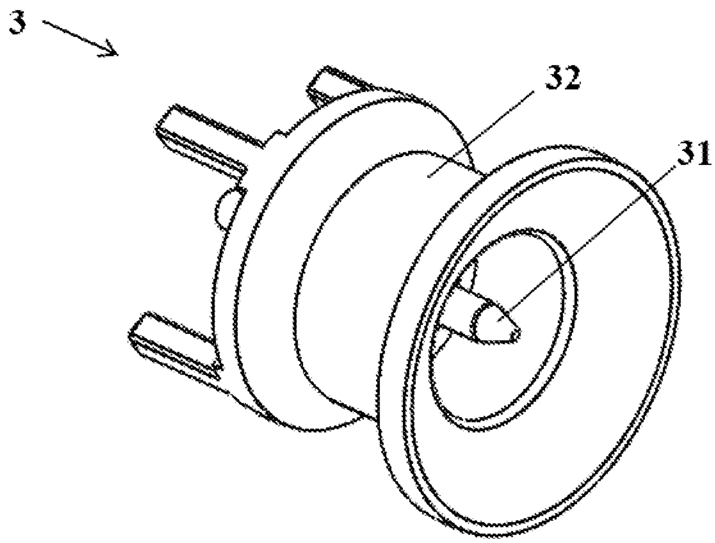
FIGS. 3A-5B respectively show perspective views and sectional views of various examples of interface members of external device-to-external device connectors according to the present disclosure.
Figure 3B:
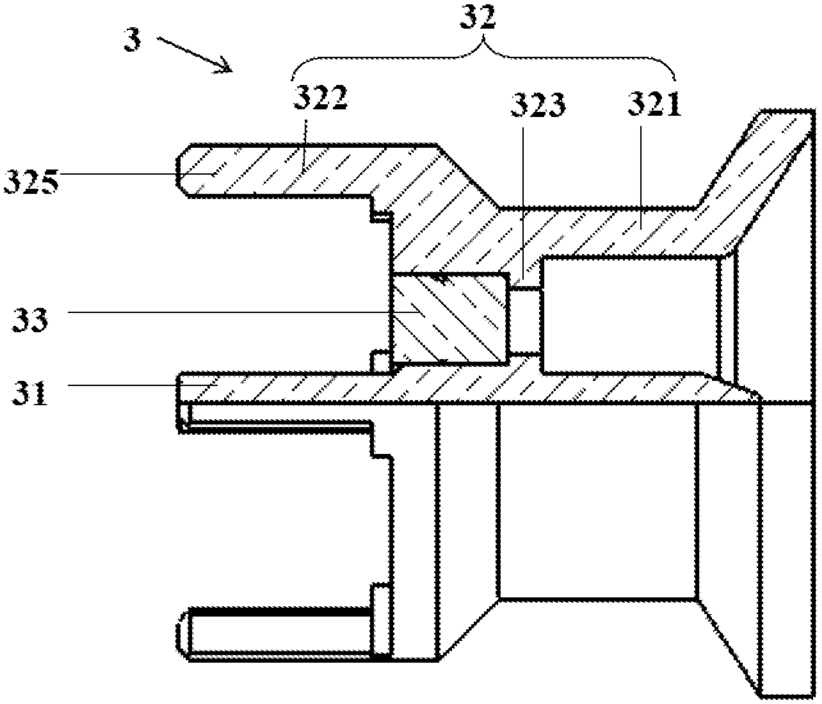

As shown in FIGS. 3A and 3B, each of the two interface members 3 includes an inner contact part 31, an outer housing 32, and an insulating layer 33 arranged between the inner contact part 31 and the outer housing 32. The inner contact part 31 is used to transmit electrical signals between two external devices 4 together with the inner conductor part 21 of the coupling member 2 (which will be described in detail later). The outer housing 32 is used to ground the external device-to-external device connector 1 and shield radio frequency signals together with the outer conductor part 22 of the coupling member 2 (which will be described in detail later). The insulating layer 33 is used to insulate the conductive inner contact part 31 from the conductive outer housing 32. The inner contact part 31 and the outer housing 32 may be made of any suitable metal material with good electrical conductivity, and the insulating layer 33 may be made of a non-metal material with good insulation performance and stable dielectric constant.

The outer housing 32 is a roughly hollow cylinder, and includes a connecting portion 321 of coupling member and the connecting portion 322 of external device that are connected to each other. The connecting portion 321 of coupling member is used to connect to the coupling member 2, and the external device connecting portion 322 is used to connect to the external device 4.

The connecting portion 321 of coupling member receives and holds the outer conductor part 22 of the coupling member 2 in its hollow interior. The connecting portion 321 of coupling member is roughly equal to or slightly smaller than the outer diameter of the outer conductor part 22 of the coupling member 2, so that the outer conductor part 22 of the coupling member 2 can be held in the connecting portion 321 of coupling member by a radially outward elastic force. The connecting portion 321 of coupling member is flared to form a hornlike shape at the free end of the hollow interior thereof so as to guide the outer conductor part 22 of the coupling member 2 into the interior of the connecting portion 321 of coupling member. The connecting portion 321 of coupling member is provided with a stepped part 323 protruding radially inward at the trumpet-shaped rear side of the hollow interior thereof to abut against the outer conductor part 22 of the coupling member 2.

Figure 3C:
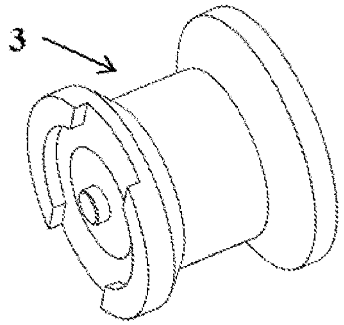
Figure 3D:
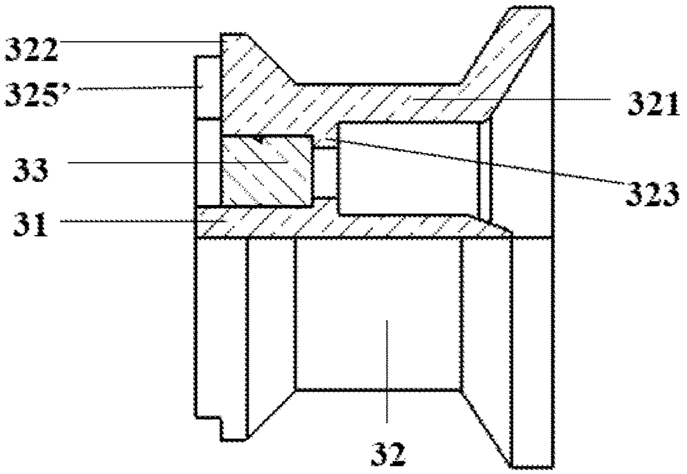
Figure 4A:
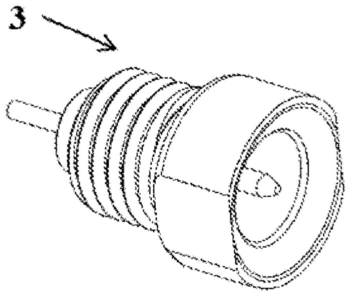
Figure 4B:
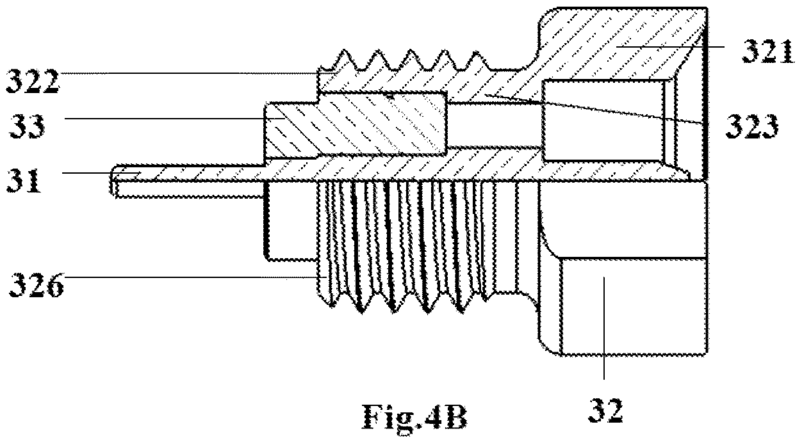
Figure 5A:
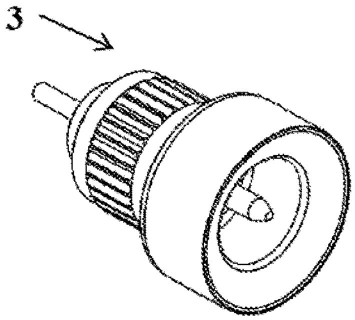
Figure 5B:
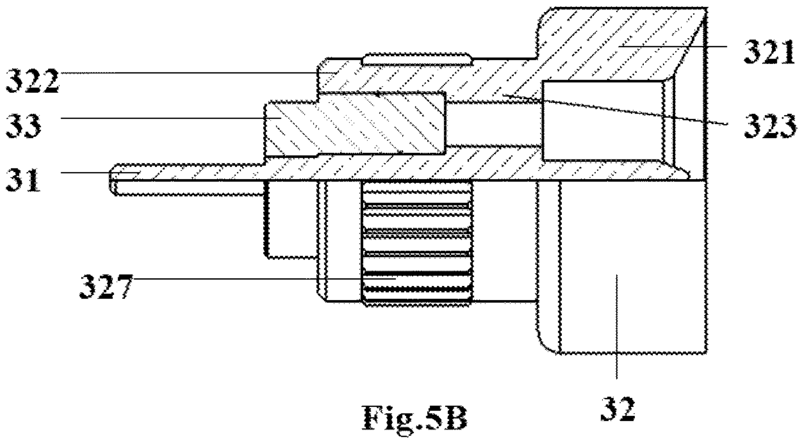

The external device connecting portion 322 fixes the insulating layer 33 of the interface member 3 in its hollow interior, while the insulating layer 33 fixes the inner contact part 31 of the interface member 3 in its hollow interior. The external device connecting portion 322 may have various connection modes (such as soldering, screw connection, compression connection, etc.) for connecting the interface member 3 to the external device 4. The connection mode shown in FIGS. 3A and 3B is soldering. In this embodiment, the external device connecting portion 322 includes one or a plurality of elongated legs 325 extending outward from the free end thereof in the axial direction. The legs 325 may be circumferentially evenly or unevenly distributed on the axial outer surface of the external device connecting portion 322. The leg 325 is used to pass through the through hole of an external device 4 such as a circuit board, so as to be fixed to the circuit board by soldering. In another example, as shown in FIGS. 3C and 3D, the external device connecting portion 322 includes one or more bumps 325' protruding outward from the free end thereof in the axial direction. The bumps 325' may be circumferentially evenly or unevenly distributed on the axial outer surface of the external device connecting portion 322. The bump 325' is used to abut against an external device 4 such as a circuit board, so as to be fixed to the circuit board by soldering etc. When the connection mode is a screw connection, as shown in FIGS. 4A and 4B, the external device connecting portion 322 is provided with an external thread 326 on its outer surface for connecting to the internal thread of the external device 4. when the connection mode is crimping, as shown in FIGS. 5A and 5B, the external device connecting portion 322 is provided with a protrusion 327 on the outer surface, and the protrusion 327 is crimped into the external device 4 by interference crimping (for example, connected with the external device 4 by interference press fitting). Two interface members 3 with the same connection mode may be provided at both ends of the coupling member 2, or two interface members 3 with different connection modes may be provided.

Returning to FIGS. 3A and 3B, the inner contact part 31 is of roughly elongated rod shape. The inner contact part 31 is provided roughly on the central axis of the outer housing 32. One end of the inner contact part 31 protrudes out of the external device connecting portion 322 for connecting to the inner conductor of the external device 4, and the other end is used for connecting to the inner conductor part 21 of the coupling member 2.

The insulating layer 33 is fixed in the hollow interior of the external device connecting portion 322, and surrounds and fixes the inner contact part 31, thereby insulating the outer housing 32 from the inner contact part 31.

Figure 6A:
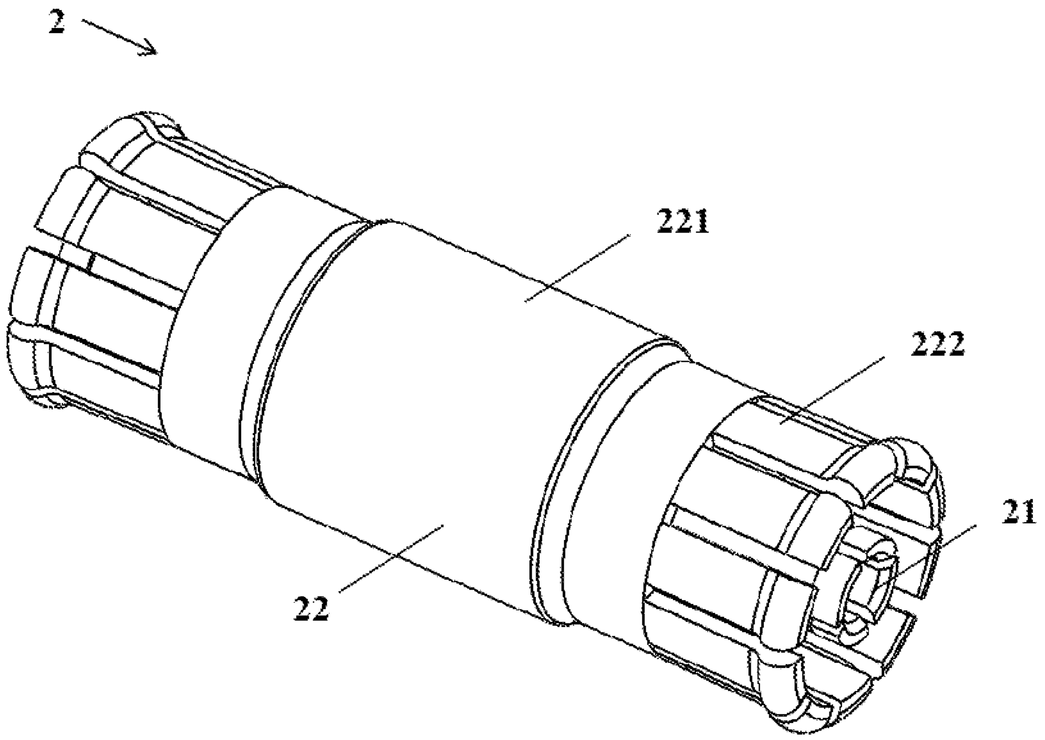
FIGS. 6A-6B respectively show a perspective view and a sectional view of a coupling member of the external device-to-external device connector of FIGS. 2A and 2B.
Figure 6B:
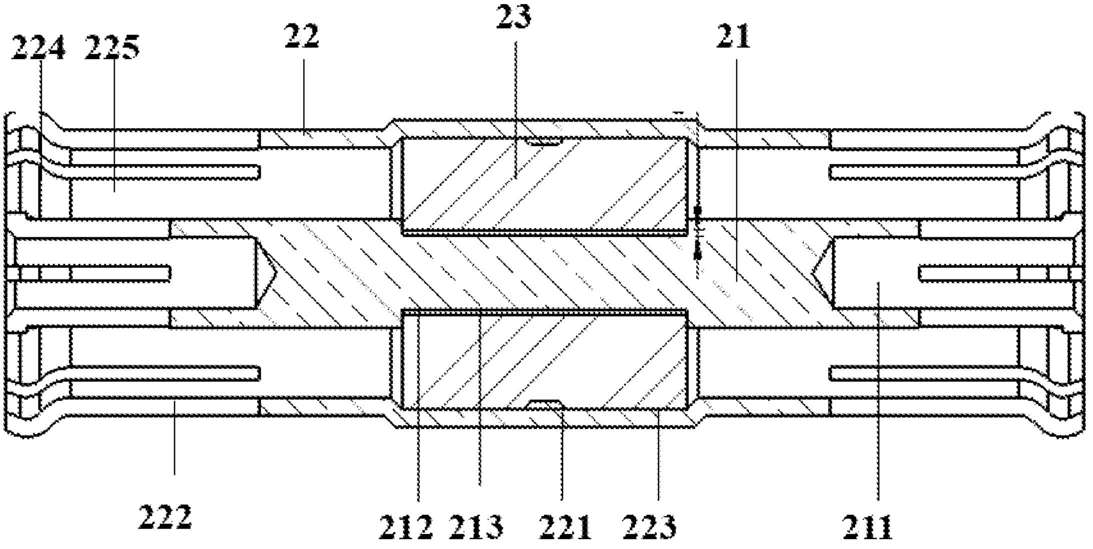

As shown in FIGS. 6A and 6B, the coupling member 2 includes an inner conductor part 21, an outer conductor part 22, and an insulating part 23 provided between the inner conductor part 21 and the outer conductor part 22. The inner conductor part 21 together with the inner contact part 31 of the interface member 3 is used to transmit electrical signals between two external devices 4. The outer conductor part 22 is used to ground the external device-to-external device connector 1 and shield radio frequency signals together with the outer housing 32 of the interface member 3. The insulating part 23 is used to insulate the conductive inner conductor part 21 from the conductive outer conductor part 22. The inner conductor part 21 and the outer conductor part 22 may be made of any suitable metal material with good electrical conductivity, while the insulating part 23 may be made of a non-metallic material with good insulation performance and stable dielectric constant.

The outer conductor part 22 is roughly a hollow cylinder, and includes a main body part 221 and two interface connecting portions 222 located at both sides of the main body part 221. The main body part 221 is provided with a concave part 223 in the middle section of its inner surface for receiving and fixing the insulating part 23. The interface member connecting portion 222 is used for connecting to the inside of the outer housing 32 of the interface member 3, and includes a plurality of elastic claw-like parts 223 axially protruding outward from the main body part 221. The plurality of elastic claw-like parts 223 may be distributed on the axial outer surface of the main body part 221 at even or uneven intervals in the circumferential direction. Each elastic claw-like part 225 is provided with a protrusion 224 extending radially outward, for example, near the free end of the elastic claw-like part 225. The outer diameter of the outer contours formed by all the protrusions 224 is slightly larger than the inner diameter of the coupling member connecting portion 321 of the interface member 3, so that when the interface member connecting portion 222 is inserted into the coupling member connecting portion 321, the protrusions 224 are pressed by the inner surface of the coupling member connecting portion 321 to elastically deform the elastic claw-like part 225 radially inward, so as to be held on the inner surface of the coupling member connecting portion 321 by the radially outward elastic force. As the elastic claw-like part 225 has certain elasticity, the outer conductor 22 can adapt to the radial offset of the interface member 3 relative to the coupling member 2, thereby adapting to the radial offset of the external device 4 relative to the coupling member 2. In addition, since the protrusion 224 can slide axially on the inner surface of the coupling member connecting portion 321, the outer conductor part 22 can adapt to the axial offset of the interface member 3 relative to the coupling member 2, thereby adapting to the axial offset of the external device 4 relative to the coupling member 2.

The insulating part 23 is received and fixed in the concave part 223 of the outer conductor part 22, and holds the inner conductor part 21 inside it, thereby insulating the outer conductor part 22 from the inner conductor part 21.

The inner conductor part 21 is roughly an elongated rod, and the cross-section may be roughly circular, roughly elliptical, roughly square, or of any other suitable shape. The inner conductor part 21 is arranged roughly on the central axis of the outer conductor part 22. Both opposite end parts of the inner conductor part 21 have grooves 211 to respectively receive the inner contact part 31 of the interface member 3. The inner contact part 31 can slide axially in the groove 211, so that the inner conductor part 21 can adapt to the axial offset of the interface member 3 relative to the coupling member 2, thereby adapting to the axial offset of the external device 4 relative to the coupling member 2.

The inner conductor part 21 and the insulating part 23 are held together by the concave-convex fitting parts facing each other, and there is a gap between the concave-convex fitting part of the inner conductor part 21 and that of the insulating part 23, which allows the inner conductor part 21 to have radial displacement relative to the insulating part 23. In an example of a concave-convex fitting part, the inner conductor part 21 is provided with a concave section 212 recessed radially inward in the middle section of its outer surface for receiving the insulating part 23. The axial length of the concave section 212 is roughly equal to that of the insulating part 23, so that the inner conductor part 21 will not have axial displacement relative to the insulating part 23. However, the diameter of the concave section 212 is smaller than the inner diameter of the insulating part 23, so that a gap 213 exists between the outer surface of the concave section 212 of the inner conductor part 21 and the inner surface of the insulating part 23. Because of the gap 213, the inner conductor part 21 can have radial displacement relative to the insulating part 23, so as to adapt to the radial offset of the interface member 3 relative to the coupling member 2, thereby adapting to the radial offset of the external device 4 relative to the coupling member 2. In other examples, a convex may be provided on the outer surface of the inner conductor part 21, a concave matched with this part may be provided on the inner surface of the insulating part 23, and there is a gap between the concave and the convex, so that the inner conductor part 21 may be radially displaced relative to the insulating part 23 so as to adapt to the radial offset of the interface member 3 relative to the coupling member 2, thereby adapting to the radial offset of the external device 4 relative to the coupling member 2.

In an alternative embodiment, the inner conductor part 21 and the insulating part 23 may be integrally formed, or separately formed but fixed together, so that radial displacement does not occur between the inner conductor part 21 and the insulating part 23. The outer conductor part 22 and the insulating part 23 are held together by the concave-convex fitting parts facing each other, and there is a gap between the concave-convex fitting part of the outer conductor part 22 and that of the insulating part 23, which allows the insulating part 23 to be radially displaced relative to the outer conductor part 22. In an example of a concave-convex fitting part, the diameter of the concave part 223 of the outer conductor part 22 is set to be larger than the outer diameter of the insulating part 23, and the axial length is roughly equal to that of the insulating part 23. Thus, a gap is left between the surface of the concave part 223 of the outer conductor part 22 and the outer surface of the insulating part 23. Because of this gap, the insulation part 23 and the inner conductor part 21 can be radially displaced relative to the outer conductor part 22, so as to adapt to the radial offset of the interface member 3 relative to the coupling member 2, thereby adapting to the radial displacement of the external device 4 relative to the coupling member 2. In other examples, a convex may be provided on the inner surface of the outer conductor part 22, and a concave area may be provided on the outer surface of the insulating part 23, with a gap between the concave area and the convex part, whereby the insulating part 23 and the inner conductor part 21 may be radially displaced relative to the outer conductor part 22 so as to adapt to the radial offset of the interface member 3 relative to the coupling member 2, thereby adapting to the radial offset of the external device 4 relative to the coupling member 2.

In the above example, the radial dimension of the gap may be between 0.05 and 0.5 mm.

An external device-to-external device connector 1001 according to a second embodiment of the present disclosure will be described below with reference to FIGS. 7A to 8B. For the external device-to-external device connector 1001, the same or similar structure will be indicated with the attached drawing marks used in the external device-to-external device connector 1 plus 1000.

Figure 7A:
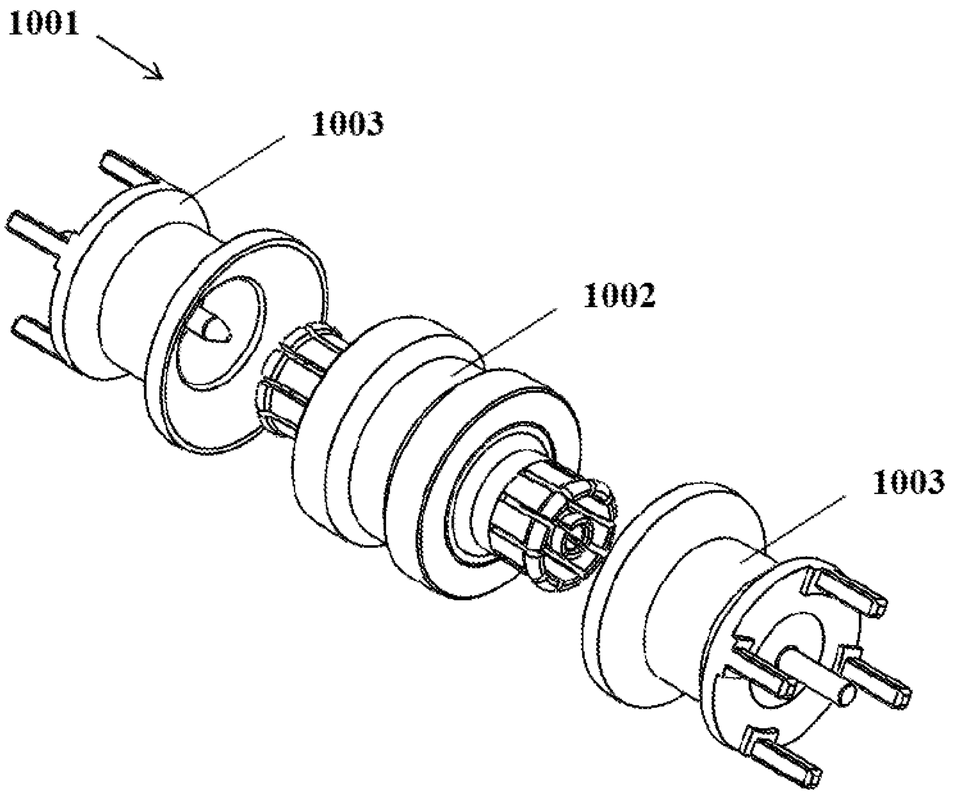
FIGS. 7A-7B respectively show an exploded perspective view and an exploded sectional view of an external device-to-external device connector according to a second embodiment of the present disclosure.
Figure 7B:
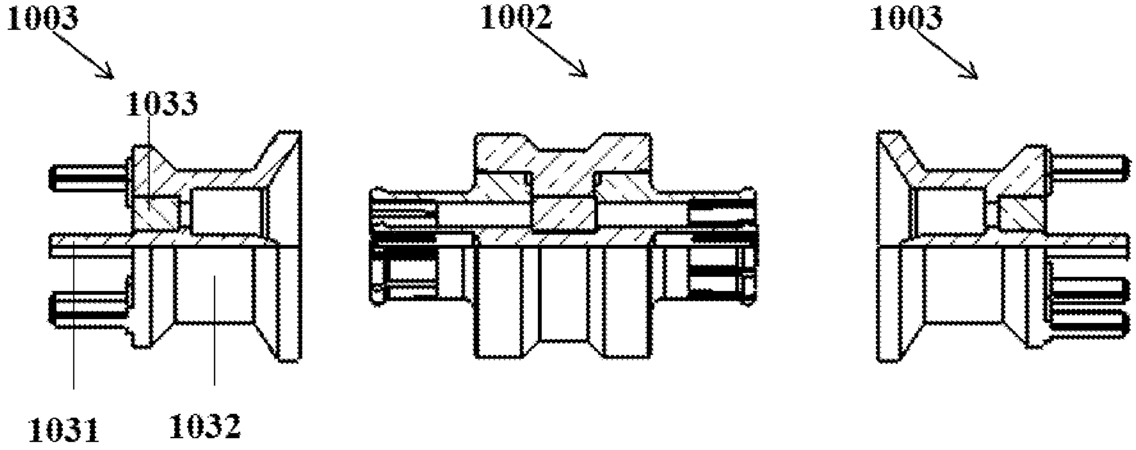

As shown in FIGS. 7A and 7B, the external device-to-external device connector 1001 includes a coupling member 1002 and two interface members 1003 connected to both ends of the coupling member 1002. The coupling member 1002 is used to mechanically and electrically connect the two interface members 1003 together, and allows one or both of the two interface members 1003 to have axial and/or radial offset relative to the coupling member 1002. Two interface members 1003 are respectively connected to two external devices 1004.

Each of the two interface members 1003 includes an inner contact part 1031, an outer housing 1032, and an insulating layer 1033 arranged between the inner contact part 1031 and the outer housing 1032. The inner contact part 1031 is used to transmit electrical signals between two external devices 1004 together with an inner conductor 1021 of the coupling member 1002, which will be described in detail below. The outer housing 1032, together with the outer conductor 1022 of the coupling member 1002, is used to ground and shield the RF signal of the board-to-board connector 1001. The insulating layer 1033 is used to insulate the conductive inner contact part 1031 and the conductive housing 1032. The inner contact part 1031 and the outer housing 1032 may be made of any suitable metal material with good electrical conductivity, and the insulating layer 1033 may be made of a non-metal material with good insulation performance and stable dielectric constant. The interface member 1003 has a structure similar to that of interface member 3, and will not be described again Two interface members 1003 with the same connection mode or two interface members 1003 with different connection modes can be set at both ends of the coupling member 1002.

Figure 8A:
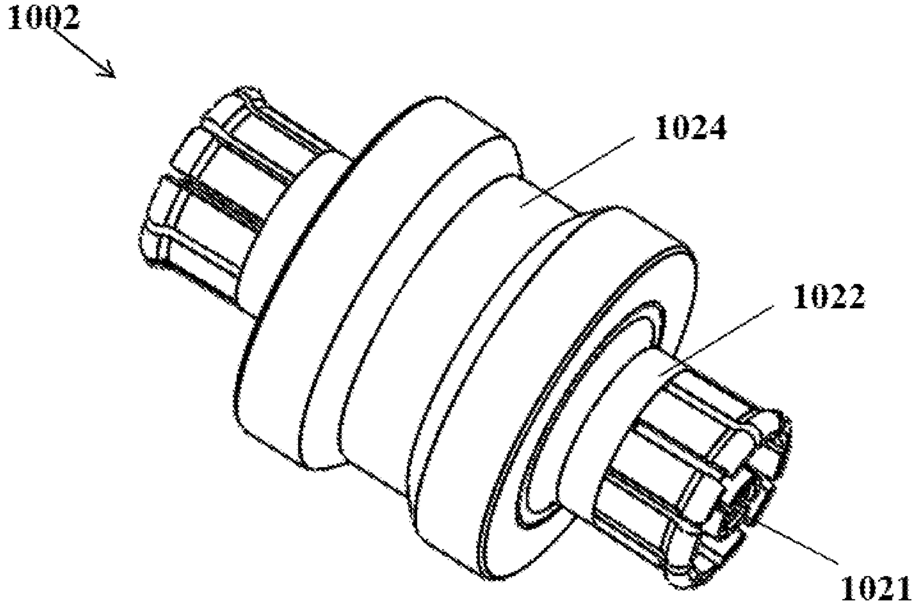
FIGS. 8A-8B show a perspective view and a sectional view of the coupling member of the external device-to-external device connector of FIGS. 7A and 7B respectively.
Figure 8B:
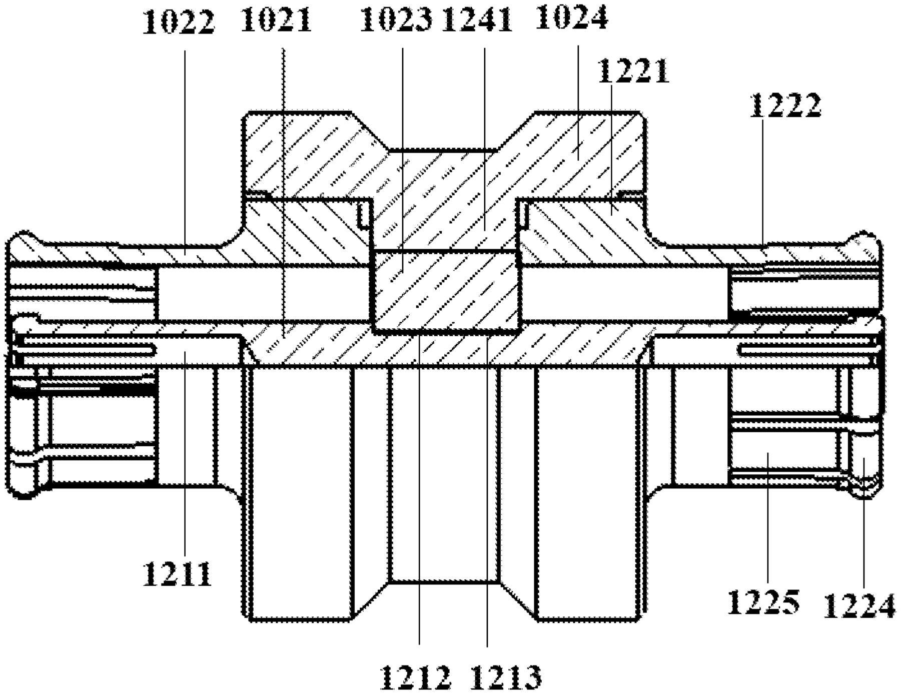

As shown in FIGS. 8A and 8B, the coupling member 1002 includes an inner conductor part 1021, an outer conductor part 1022, an insulation part 1023, and an outer housing 1024. The inner conductor part 1021 is used together with the inner contact part 1031 of the interface member 1003 for transmitting electrical signals between two external devices 1004. The outer conductor part 1022 and the outer housing 1024 together with the outer housing 1032 of the interface member 1003 are used to ground the board-to-board connector 1001 and shield the RF signal. The insulating part 1023 is used to insulate the conductive inner conductor 1021 from the conductive outer conductor 1022 and the outer housing 1024. The inner conductor 1021, the outer conductor 1022, and the outer housing 1024 may be made of any suitable metal material with good electrical conductivity, while the insulating part 1023 may be made of a non-metallic material with good insulation performance and stable dielectric constant.

The outer housing 1024 is roughly a hollow cylinder. The middle section of the outer housing 1024 is provided with a stepped part 1241 which radially protrudes inward to fix the insulating part 1023. The outer housing 1024 receives and fixes two outer conductor parts 1022 on the longitudinal sides of the stepped part 1241. Two outer conductor parts 1022 respectively abut against two opposite side surfaces of stepped part 1241.

The outer conductor part 1022 is roughly a hollow cylinder and comprises a main body part 1221 and an interface member connecting portion 1222 outside the main body part 1221. The outer diameter of the main body part 1221 is roughly equal to or slightly larger than the inner diameter of the outer housing 1024 on both sides of the stepped part 1241, so that the main body part 1221 is firmly received and fixed inside the outer housing 1024. The interface member connecting portion 1222 is used for connecting to the interior of the outer housing 1032 of the interface member 1003, and includes a plurality of elastic claw-like parts 1223 axially extending outward from the main body part 1221. The plurality of elastic claw-like parts 1223 may be distributed on the axial outer surface of the main body part 1221 at uniform or uneven intervals in the circumferential direction. Each elastic claw-like part 1225 is provided with a protrusion 1224 protruding radially outward, for example, near the free end of the elastic claw-like part 1225. The outer diameter of the outer contour formed by all the protrusions 1224 is slightly larger than the inner diameter of the coupling connecting portion of the interface member 1003, so that when the interface member connecting portion 1222 is inserted into the coupling connecting portion, the protrusions 1224 are pressed by the inner surface of the coupling connecting portion to elastically deform the elastic claw-like part 1225 radially inward, so as to be held on the inner surface of the coupling member by radially outward elastic force. Because the elastic claw-like part 1225 has certain elasticity, the outer conductor 1022 can adapt to the radial offset of the interface member 1003 relative to the coupling member 1002, thereby adapting to the radial offset of the external device 1004 relative to the coupling member 1002. In addition, since the protrusion 1224 can slide axially on the inner surface of the coupling member, the outer conductor part 1022 can adapt to the axial offset of the interface part 1003 relative to the coupling member 1002, thereby adapting to the axial offset of the external device 1004 relative to the coupling member 1002.

The insulating part 1023 is fixed in the stepped part 1241 of the outer housing 1024, and holds the inner conductor part

1021 inside it, thereby insulating the outer conductor part 1022 from the inner conductor part 1021.

The inner contact part 1021 is a roughly elongated rod body, and the cross-section may be roughly circular, roughly elliptical, roughly square, or of any other suitable shape. The inner conductor part 1021 is arranged roughly on the central axis of the outer conductor part 1022. Both opposite ends of the inner conductor part 1021 have grooves 1211 to respectively receive the inner contact parts 1031 of the interface members 1003. The inner contact part 1031 can slide axially in the groove 1211, so that the inner conductor part 1021 can adapt to the axial offset of the interface member 1003 relative to the coupling member 1002, thereby adapting to the axial offset of the external device 1004 relative to the coupling member 1002.

The inner conductor part 1021 and the insulating part 1023 are held together by the concave-convex fitting parts facing each other, and there is a gap between the concave-convex fitting part of the inner conductor part 1021 and that of the insulating part 1023, which allows the inner conductor part 1021 to have radial displacement relative to the insulating part 1023. In an example of a concave-convex fitting part, the inner conductor part 1021 is provided with a concave 1212 recessed radially inward in the middle section of its outer surface for receiving the insulating part 1023. The axial length of the concave 1212 is roughly equal to that of the insulating part 1023, so that the inner conductor part 1021 does not have axial displacement relative to the insulating part 1023. However, the diameter of the concave 1212 is smaller than the inner diameter of the insulating part 1023, so that a gap 1213 exists between the outer surface of the concave 1212 of the inner conductor part 1021 and the inner surface of the insulating part 1023. Because of the gap 1213, the inner conductor part 1021 can be radially displaced relative to the insulating part 1023, so as to adapt to the radial offset of the interface part 1003 relative to the coupling member 1002, thereby adapting to adapt to the radial offset of the external device 1004 relative to the coupling member 1002. In other examples, a convex may be provided on the outer surface of the inner conductor part 1021, a concave matched with the convex may be provided on the inner surface of the insulating part 1023, and there is a gap between the concave and the convex, so that the inner conductor part 1021 may be radially displaced relative to the insulating part 1023, thereby adapting to the radial offset of the interface member 1003 relative to the coupling member 1002, thereby adapting to the radial offset of the external device 1004 relative to the coupling member 1002.

In an alternative embodiment, the inner conductor part 1021 and the insulation part 1023 may be integrally formed, or separately formed but fixed together, so that no radial displacement occurs between the inner conductor part 1021 and the insulation part 1023. The stepped part 1241 and the insulating part 1023 of the outer housing 1024 are held together by the concave-convex fitting parts opposite to each other, and there is a gap between the concave-convex fitting part of the stepped part 1241 of the outer housing 1024 and that of the insulating part 1023, which allows the insulating part 1023 to have radial displacement relative to the outer housing 1024. In an example of a concave-convex fitting part, the stepped part 1241 of the outer housing 1024 is provided with a concave, and the diameter of the concave is set to be larger than the outer diameter of the insulating part 1023, and the axial length is roughly equal to that of the insulating part 1023. Thus, a gap is left between the surface of the concave of the stepped part 1241 of the outer case 1024 and the outer surface of the insulating part 1023. Because of this gap, the insulation part 1023 and the inner conductor part 1021 can be radially displaced relative to the outer housing 1024, so as to adapt to the radial offset of the interface part 1003 relative to the coupling member 1002, thereby adapting to the radial offset of the external device 1004 relative to the coupling member 1002. In other examples, a convex may be provided on the inner surface of the stepped part 1241 of the outer housing 1024, a concave may be provided on the outer surface of the insulating part 1023, and there is a gap between the concave and the convex, so that the insulating part 1023 and the inner conductor part 1021 may be radially displaced relative to the outer housing 1024 so as to adapt to the radial offset of the interface member 1003 relative to the coupling member 1002, thereby adapting to the radial offset of the external device 1004 relative to the coupling member 1002.

In the above example, the radial dimension of the gap may be between 0.05 and 0.5 mm.

Figure 9A:
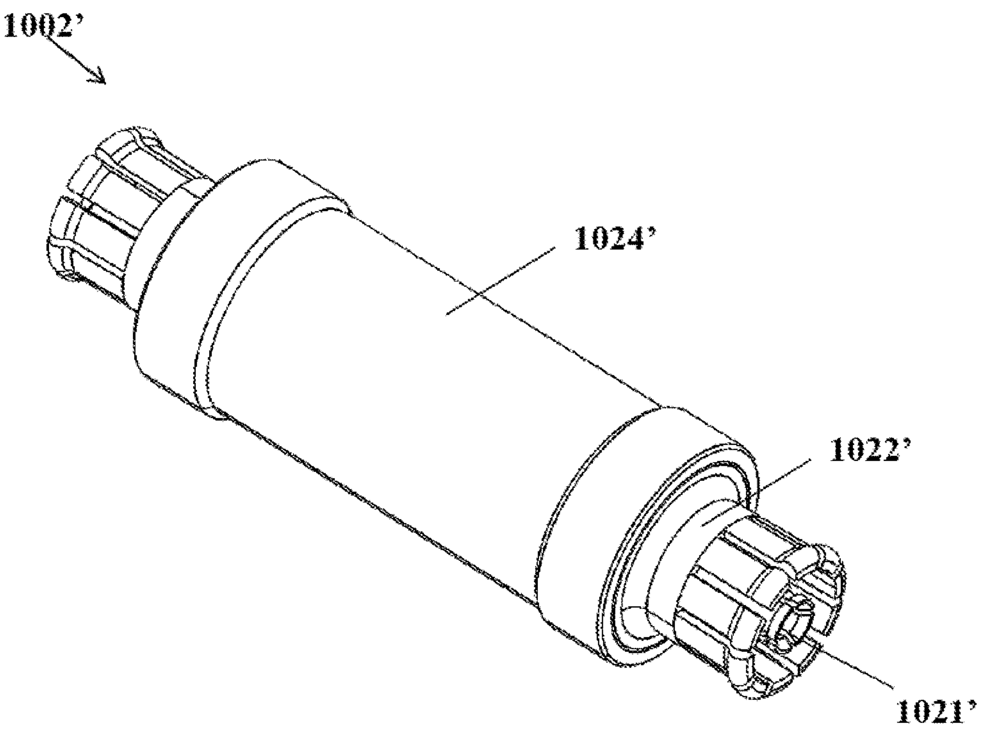
FIGS. 9A-9B show respectively a perspective view and a sectional view of another coupling member of the external device-to-external device connector of FIGS. 7A and 7B.
Figure 9B:
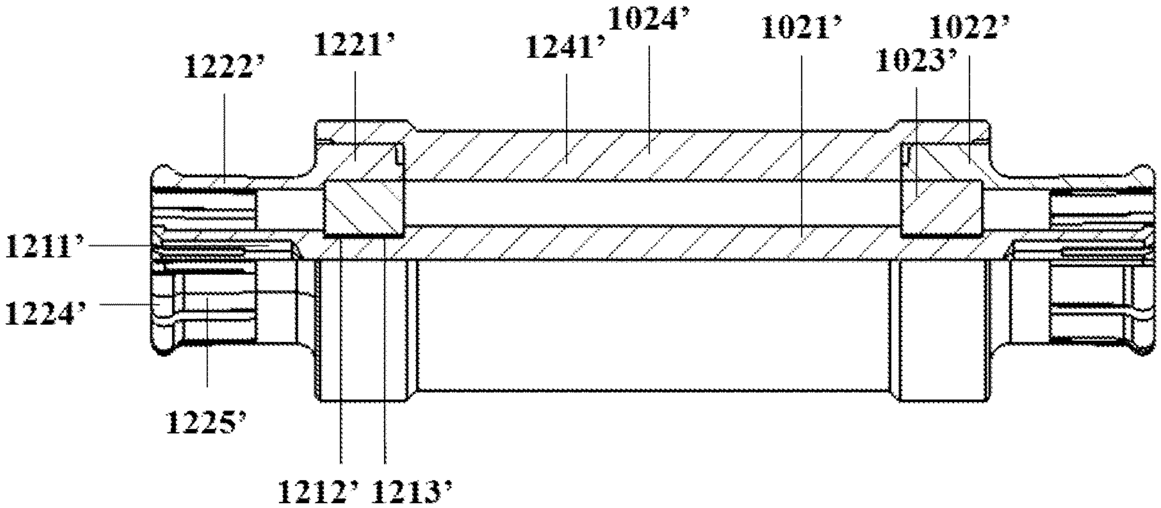

Next, another form of coupling member 1002 will be described with reference to FIGS. 9A-9B. As shown in the figure, the coupling member 1002' includes an inner conductor part 1021', an outer conductor part 1022', an insulating part 1023', and an outer housing 1024'. The inner conductor part 1021', together with the inner contact part 1031 of the interface member 1003, is used to transmit electrical signals between two external devices 1004. The outer conductor part 1022' and the outer housing 1024' together with the outer housing 1032 of the interface member 1003 are used for grounding the external device-to-external device connector 1001 and shielding radio frequency signals. The insulating part 1023' is used to insulate the conductive inner conductor part 1021' from the conductive outer conductor part 1022' and the outer housing 1024'. The inner conductor part 1021', the outer conductor part 1022' and the outer housing 1024' can be made of any suitable metal material with good electrical conductivity, while the insulating part 1023' can be made of non-metal material with good insulation performance and stable dielectric constant.

The outer housing 1024' is a roughly hollow cylinder. The outer housing 1024' is provided with a stepped part 1241' protruding radially inward in the middle section of its hollow interior. The outer housing 1024' receives and fixes two outer conductor parts 1022' on both sides of the stepped part 1241' in the longitudinal direction. The two outer conductor parts 1022' respectively abut against two opposite side surfaces of the stepped part 1241'.

The outer conductor part 1022' is a roughly hollow cylinder, and includes a main body part 1221' and an interface member connecting portion 1222' located outside the main body part 1221'. The outer diameter of the main body 1221' is roughly equal to or slightly larger than the inner diameter of the outer housing 1024' on both sides of the stepped part 1241', so that the main body part 1221' is firmly received and fixed inside the outer housing 1024'. The interface member connecting portion 1222' is used for connecting to the interior of the outer housing 1032 of the interface member 1003, and includes a plurality of elastic claw-like parts 1223' axially extending outward from the main body part 1221'. The elastic claw-like parts 1223' may be distributed on the axial outer surface of the main body part 1221' at uniform or uneven intervals in the circumferential direction. Each elastic claw-like part 1225' is provided with a protrusion 1224' protruding radially outward, for example, near the free end of the elastic claw-like part 1225'. The outer diameter of the outer contour formed by all the protrusions 1224' is slightly larger than the inner diameter of the coupling connecting portion of the interface member 1003, so that when the interface member connecting portion 1222' is inserted into the coupling connecting portion, the protrusions 1224' are pressed by the inner surface of the coupling connecting portion to elastically deform the elastic claw-like part 1225' radially inward, so as to be held on the inner surface of the coupling member by radially outward elastic force. Because the elastic claw-like part 1225' has certain elasticity, the outer conductor 1022' can adapt to the radial offset of the interface member 1003 relative to the coupling member 1002', thereby adapting to the radial offset of the external device 1004 relative to the coupling member 1002'. In addition, since the protrusion 1224' can slide axially on the inner surface of the coupling member, the outer conductor part 1022' can adapt to the axial offset of the interface part 1003 relative to the coupling member 1002', thereby adapting to the axial offset of the external device 1004 relative to the coupling member 1002'.

The two insulating parts 1023' are respectively fixed in the main body parts 1221' of the two outer conductor parts 1022', and the inner conductor part 1021' is held inside, thereby insulating the outer conductor part 1022 from the inner conductor part 1021'.

The inner conductor part 1021 is a roughly elongated rod body, and the cross-section may be roughly circular, roughly elliptical, roughly square, or of any other suitable shape. The inner conductor part 1021' is disposed roughly on the central axis of the outer conductor part 1022'. Both opposite ends of the inner conductor part 1021' have grooves 1211' to receive the inner contact parts 1031 of the interface members 1003, respectively. The inner contact part 1031 can slide axially in the groove 1211'. so that the inner conductor part 1021 can adapt to the axial offset of the interface member 1003 relative to the coupling member 1002', thereby adapting to the axial offset of the external device 1004 relative to the coupling member 1002'.

The inner conductor part 1021' and the insulating part 1023' are held together by the concave-convex fitting parts facing each other, and there is a gap between the concave-convex fitting part of the inner conductor part 1021' and that of the insulating part 1023', which allows the inner conductor part 1021' to have radial displacement relative to the insulating part 1023'. In an example of a concave-convex fitting part, the inner conductor part 1021' is provided with a concave 1212' recessed radially inward in the middle section of its outer surface for receiving the insulating part 1023'. The axial length of the concave 1212' is roughly equal to that of the insulating part 1023', so that the inner conductor part 1021' does not have axial displacement relative to the insulating part 1023'. The diameter of the concave 1212' is smaller than the inner diameter of the insulating part 1023', so that a gap 1213' exists between the outer surface of the concave 1212' of the inner conductor part 1021' and the inner surface of the insulating part 1023'. Because of the gap 1213', the inner conductor part 1021' can be radially displaced relative to the insulating part 1023', so as to adapt to the radial offset of the interface part 1003 relative to the coupling member 1002', thereby adapting to adapt to the radial offset of the external device 1004 relative to the coupling member 1002'. In other examples, a convex may be provided on the outer surface of the inner conductor part 1021', a concave matched with the convex may be provided on the inner surface of the insulating part 1023', and there is a gap between the concave and the convex, so that the inner conductor part 1021' may be radially displaced relative to the insulating part 1023', thereby adapting to the radial offset of the interface member 1003 relative to the coupling member 1002', thereby adapting to the radial offset of the external device 1004 relative to the coupling member 1002'.

In an alternative embodiment, the inner conductor part 1021' and the insulation part 1023' may be integrally formed, or separately formed but fixed together, so that no radial displacement occurs between the inner conductor part 1021' and the insulation part 1023'. The outer conductor part 1022' and the insulating part 1023' are held together by the concave-convex fitting part opposite to each other. There is a gap between the concave-convex fitting part of the outer conductor part 1022' and that of the insulating part 1023', and the gap allows the insulating part 1023' to be radially displaced relative to the outer conductor part 1022'. In an example of a concave-convex fitting part, the outer conductor part 1022' is provided with a concave, the diameter of the concave is set to be greater than the outer diameter of the insulating part 1023', and the axial length is roughly equal to that of the insulating part 1023'. Thus, a gap is left between the surface of the concave of the outer conductor part 1022 and the outer surface of the insulating part 1023'. Because of the gap, the insulation part 1023' and the inner conductor part 1021' can be radially displaced relative to the outer conductor part 1022', so as to adapt to the radial offset of the interface member 1003 relative to the coupling member 1002', thereby adapting to the radial offset of the external device 1004 relative to the coupling member 1002'. In other examples, a convex may be provided on the inner surface of the outer conductor part 1022', while a concave may be provided on the outer surface of the insulating part 1023', and there is a gap between the concave and the convex, so that the insulating part 1023' and the inner conductor part 1021' can be radially displaced relative to the outer conductor part 1022' so as to adapt to the radial offset of the interface member 1003 relative to the coupling member 1002', thereby adapting to the radial offset of the external device 1004 relative to the coupling member 1002'.

In the above example, the radial dimension of the gap may be between 0.05 and 0.5 mm.

The flexibility of the external device-to-external device connector according to the embodiment of the present disclosure enables correct connection even when two external devices are not perfectly aligned with each other. That is, the external device-to-external device connector can absorb the axial deviation and radial deviation between two external devices. For example, the external device-to-external device connector can absorb the axial deviation of +/−1.1 mm between two external devices. For another example, the external device-to-external device connector can absorb the radial deviation of +/−1.1 mm between two external devices.

The external device-to-external device connector according to the embodiment of the present disclosure can achieve satisfactory RL and PIM performance.

The external device-to-external device connector according to the embodiment of the present disclosure can be applied to various occasions, such as circuit board to circuit board, circuit board to device, and device to device.

The external device-to-external device connector according to the embodiments of the present disclosure has a simple structure and low cost.

The external device-to-external device connector according to the embodiment of the present disclosure is small in size and light in weight.

Although the exemplary embodiments of the present disclosure have been described, it should be understood by those of ordinary skill in the art that a plurality of variations and changes can be created and made to the exemplary embodiments of the present disclosure without essentially departing from the spirit and scope of the present disclosure. Therefore, all variations and changes are included in the protection scope of the present disclosure defined by the claims. The present disclosure is defined by the attached claims, and equivalents of these claims are also included.

The invention claimed is:

1. An external device-to-external device connector for a wireless communication base station, wherein the external device-to-external device connector is configured to electrically connect two spaced external devices together, and comprises:

two interface members, each of which comprises an inner contact part, an insulating layer and an outer housing sequentially from inside to outside in the radial direction, wherein the outer housing of the interface member comprises a coupling member connecting portion and an external device connecting portion that are connected with each other, and the external device connecting portion is configured to be connected to an external device; and a coupling member, configured to connect the two interface members together and comprising an inner conductor part, at least one insulation part and at least one outer conductor part sequentially from inside to outside in the radial direction, wherein the inner conductor part receives and holds the ends of the inner contact parts of the two interface members at both ends, the insulation part is configured to space the inner conductor part and the outer conductor part, and the end part of the outer conductor part is received and held in the coupling member connecting portion of the outer housing of the interface member;

wherein the inner conductor part and the insulation part of the coupling member are held together by the concave-convex fitting parts opposite to each other, and there is a first gap between the concave-convex fitting part of the inner conductor part and that of the insulation part, which allows the inner conductor part to have radial displacement relative to the insulation part; or, the outer conductor part and the insulating part of the coupling member are held together by the concave-convex fitting parts opposite to each other, and there is a second gap between the concave-convex fitting part of the outer conductor part and that of the insulating part, which allows radial displacement of the insulating part relative to the outer conductor part.

2. The external device-to-external device connector according to claim 1, wherein the inner diameter of the coupling member is roughly equal to or slightly smaller than the outer diameter of the outer conductor part of the coupling member, and the outer conductor part of the coupling member is held in the coupling member by radially outward elastic force.

3. The external device-to-external device connector according to claim 1, wherein the coupling member is flared to form a hornlike shape at the free end of its hollow interior, so as to guide the outer conductor part of the coupling member into the interior of the coupling member.

4. The external device-to-external device connector according to claim 1, wherein the coupling member is provided with a stepped part in its hollow interior to abut against the outer conductor part of the coupling member.

5. The external device-to-external device connector according to claim 1, wherein the external device connecting portion fixes the insulating layer of the interface member in its hollow interior.

6. The external device-to-external device connector according to claim 1, wherein the external device is a base station antenna, a filter, and/or a radio remote unit.

7. The external device-to-external device connector according to claim 1, wherein the external device connecting portion connects the interface member to the external device by welding, screwing or compression.

8. The external device-to-external device connector according to claim 1, wherein the external device connecting portion comprises one or a plurality of elongated legs extending axially outward from its free end, and the one or the plurality of legs are configured to pass through the through holes on the external device and be welded to the external device.

9. The external device-to-external device connector according to claim 1, wherein the external device connecting portion is provided with an external thread on its outer surface configured to be connected to the internal thread of the external device.

10. The external device-to-external device connector according to claim 1, wherein the external device connecting portion enters the cavity of the external device by interference compression.

11. The external device-to-external device connector according to claim 1, wherein the inner contact part is roughly arranged on the central axis of the outer housing of the interface member.

12. The external device-to-external device connector according to claim 1, wherein the insulating layer is fixed in the hollow interior of the external device connecting portion and surrounds and fixes the inner contact part.

13. The external device-to-external device connector according to claim 1, wherein both opposite ends of the inner conductor part have grooves to respectively receive the inner contact parts of the two interface members, wherein the inner contact parts can slide axially in the grooves.

14. The external device-to-external device connector according to claim 1, wherein the outer surface of the inner conductor part is provided with at least one concave for receiving the at least one insulating part, and the first gap is located between the concave surface and the inner surface of the insulating part.

15. The external device-to-external device connector according to claim 14, wherein the axial length of the concave is roughly equal to that of the insulating part, and the diameter of the concave is smaller than the inner diameter of the insulating part.

16. The external device-to-external device connector according to claim 1, wherein the outer conductor part comprises a main body part and two interface member connecting portions located at two sides of the main body part, wherein the interface member connecting portions are configured to be connected into the coupling member connecting portion of the outer housing of the interface member.

17. The external device-to-external device connector according to claim 1, wherein the coupling member comprises two insulating parts and two outer conductor parts, and further comprises an outer housing, and each outer conductor part comprises a main body part and an interface member connecting portion located outside the main body part, wherein the main body parts of the two outer conductor parts are respectively received and fixed in both ends of the outer housing of the coupling member, two insulation parts are respectively held inside, and the two interface member connecting portions are respectively connected into the coupling member connecting portions of the outer housings of the two interface members.

18. The external device-to-external device connector according to claim 1, wherein the radial dimension of the first gap and the second gap is between 0.05 and 0.5 mm.

19. An external device-to-external device connector for a wireless communication base station, wherein the external device-to-external device connector is configured to electrically connect two spaced external devices together, and comprises:

two interface members, each of which comprises an inner contact part, an insulating layer and an outer housing sequentially from inside to outside in the radial direction, wherein the outer housing of the interface member comprises a coupling member connecting portion and an external device connecting portion that are connected with each other, and the external device connecting portion is configured to be connected to an external device; and a coupling member, configured to connect the two interface members together and comprising an inner conductor part, an insulation part, two outer conductor parts, and an outer housing sequentially from inside to outside in a radial direction, wherein the inner conductor part receives and holds the ends of inner contact parts of the two interface members at both ends, and the insulation part is configured to space the inner conductor part from the outer conductor part, the ends of the two outer conductor parts are received and held in the coupling member connecting portion of the outer housing of the interface member, and the outer housing is configured to hold the two outer conductor parts and the insulating part;

wherein the inner conductor part and the insulation part of the coupling member are held together by the concave-convex fitting parts opposite to each other, and there is a first gap between the concave-convex fitting part of the inner conductor part and that of the insulation part, which allows the inner conductor part to have radial displacement relative to the insulation part; or, the outer housing and the insulating part of the coupling member are held together by the concave-convex fitting parts opposite to each other, and there is a second gap between the concave-convex fitting part of the outer housing and that of the insulating part of the coupling member, which allows radial displacement of the insulating part relative to the outer housing of the coupling member.

* * * * *